US011681988B2

(12) United States Patent
Diehl et al.

(10) Patent No.: US 11,681,988 B2
(45) Date of Patent: Jun. 20, 2023

(54) SYSTEMS AND METHODS FOR SCHEDULING AND COORDINATING PARKING SPOTS

(71) Applicant: Pony AI Inc., Grand Cayman (KY)

(72) Inventors: Peter G. Diehl, Shanghai (CN); Robert Dingli, Cupertino, CA (US)

(73) Assignee: Pony AI Inc., Grand Cayman (KY)

(*) Notice: Subject to any disclaimer, the term of this patent is extended or adjusted under 35 U.S.C. 154(b) by 687 days.

(21) Appl. No.: 16/592,687

(22) Filed: Oct. 3, 2019

(65) Prior Publication Data

US 2021/0103896 A1    Apr. 8, 2021

(51) Int. Cl.
*G06Q 10/1093* (2023.01)
*B60W 30/10* (2006.01)

(52) U.S. Cl.
CPC ......... *G06Q 10/1095* (2013.01); *B60W 30/10* (2013.01)

(58) Field of Classification Search
CPC .......................... G06Q 10/1095; B60W 30/10
See application file for complete search history.

(56) References Cited

U.S. PATENT DOCUMENTS

| 10,423,162 | B2* | 9/2019 | Yai | G08G 1/149 |
|---|---|---|---|---|
| 2017/0267233 | A1* | 9/2017 | Minster | B62D 15/02 |
| 2017/0292854 | A1* | 10/2017 | Zhang | G05D 1/0088 |
| 2017/0323227 | A1* | 11/2017 | Sadeghi | G06Q 20/102 |
| 2018/0113457 | A1* | 4/2018 | Iagnemma | B60W 30/00 |
| 2019/0016331 | A1 | 1/2019 | Carlson et al. | |
| 2019/0016384 | A1 | 1/2019 | Carlson et al. | |
| 2019/0202304 | A1* | 7/2019 | Moghe | B60L 53/38 |
| 2019/0259275 | A1* | 8/2019 | Kubo | G08G 1/162 |

* cited by examiner

*Primary Examiner* — Jonathan L Sample
*Assistant Examiner* — Elizabeth Rose Neleski

(57) ABSTRACT

Systems, methods, and non-transitory computer-readable media can receive stop point data from a plurality of sources. The stop point data can be aggregated into a central repository. A request for stop point data at a particular location can be received from a first vehicle. The stop point data at the particular location stored in the central repository can be transmitted to the first vehicle.

20 Claims, 10 Drawing Sheets

SYSTEMS AND METHODS FOR SCHEDULING AND COORDINATING PARKING SPOTS

TECHNICAL FIELD

The present disclosure relates generally to vehicles such as autonomous vehicles (AVs) determining a viable stop point at which to pick up, drop off, or park and maneuvering to the stop point.

BACKGROUND

Vehicles such as autonomous vehicles (AVs) may transport passengers or items to destinations. At each destination, the vehicle determines a stop point at which to pick up or drop off passengers or items during a brief stop, or to park for a longer duration. The stop point should be legal, safe for the vehicle, safe for surrounding traffic, and safe for an owner of the vehicle. Currently, assistive parking or autonomous parking technologies may assist vehicles in parking. However, assistive parking or autonomous parking technologies do not look for a parking spot, pick up, or drop off point until the vehicle arrives at a destination. Therefore, vehicles spend time searching for a parking spot, pick up, or drop off point. Additionally, solely utilizing the vehicle's own sensors (camera, Lidar, radar, GPS, sonar, ultrasonic, IMU (inertial measurement unit), accelerometers, gyroscopes, magnetometers, and FIR (far infrared) sensors) may not allow the vehicle to locate a parking spot, pick up, or drop off point unless the vehicle is within a close proximity to the parking spot, pick up, or drop off point. These shortfalls are addressed by the present disclosures, which provides an efficient and effective system and method of finding a stop point (pick up, drop off location or parking), for example, before arriving at a destination.

SUMMARY

Various embodiments of the present disclosure provide systems, methods, and non-transitory computer-readable media that can receive stop point data from a plurality of sources. The stop point data can be aggregated into a central repository. A request for stop point data at a particular location can be received from a first vehicle. The stop point data at the particular location stored in the central repository can be transmitted to the first vehicle.

In some embodiments, the stop point data can include mapping and pictorial data associated with stop points, and the plurality of sources can include at least one of vehicles, satellites, or road sensors.

In some embodiments, the mapping and pictorial data associated with the stop points can include at least point cloud data of a LiDAR.

In some embodiments, the stop point data can include location coordinates of available stop points, and the plurality of sources can include at least one of vehicles or road sensors.

In some embodiments, a request to reserve a stop point at the particular location can be received from the first vehicle. The central repository can be updated with the request to reserve the stop point at the particular location.

In some embodiments, the request to reserve the stop point at the particular location can be determined by the first vehicle based on analyzing the stop point data at the particular location that a stop point is available at the particular location.

In some embodiments, a request to coordinate stop points at the particular location can be received from the first vehicle. An indication that the second vehicle will soon depart a stop point at the particular location can be received from a second vehicle. Location coordinates of the stop point currently occupied by the second vehicle can be transmitted to the first vehicle.

In some embodiments, the request to coordinate stop point at the particular location can be determined by the first vehicle based on analyzing the stop point data at the particular location that a stop point is not available at the particular location.

In some embodiments, an instruction can be transmitted to the second vehicle to delay departing the stop point at the particular location to allow the first vehicle to arrive at the stop point at the particular location within a time period.

In some embodiments, an indication that the second vehicle needs to depart immediately the stop point at the particular location can be received. An instruction can be transmitted to a third vehicle, nearby the particular location, to occupy the stop point at the particular location until the first vehicle arrives.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
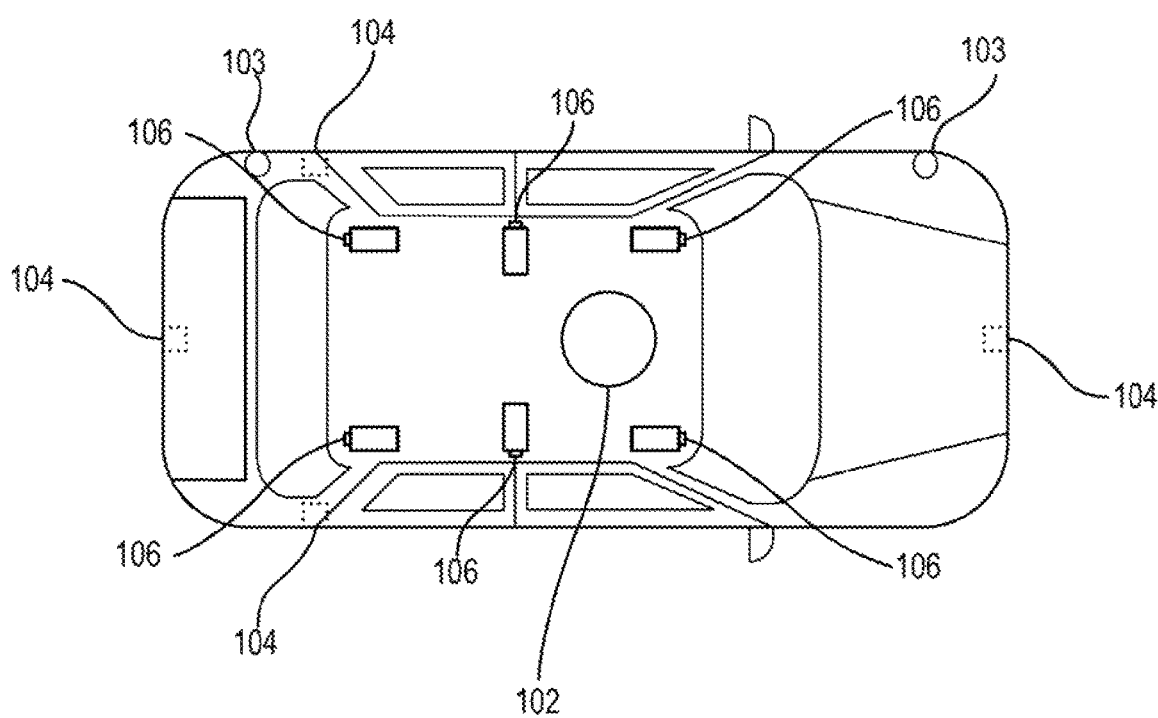
FIG. 1 illustrates an example vehicle (e.g., autonomous vehicle), according to an embodiment of the present disclosure.

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Various embodiments overcome problems specifically arising in the realm of autonomous vehicle technology. Sensors on an autonomous vehicle may assist in finding a stop point (parking spot, drop off or pick up point). In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure.

In some embodiments, the autonomous vehicle can detect or identify one or more stop points based on its onboard sensors. For example, the autonomous vehicle can use its onboard LiDAR to identify one or more stop points. As another example, the autonomous vehicle can use its onboard cameras to identify one or more stop points. In some embodiments, the autonomous vehicle can upload data associated with stop points to a central repository on a server for consumption by other vehicles over a network. For example, other vehicles may request data associated with stop points, process the data, and identify one or more stop points based on the data. For instance, a first vehicle may upload data (e.g., point cloud data) gathered by a LiDAR that is associated with one or more stop points to the central repository. In this example, a second vehicle may request the point cloud data from the central repository, and process the point cloud data to identify one or more stop points. In some embodiments, the autonomous vehicle may upload location coordinates associated with one or more stop points to the central repository. The central repository may update and/or maintain a database of stop points that is accessible to other vehicles over a network. For example, an autonomous vehicle may request the server to provide stop point information at a particular location. These and other embodiments of the inventions are discussed below.

FIG. 1 illustrates an example vehicle such as an autonomous vehicle 100, according to an embodiment of the present disclosure. A vehicle 100 generally refers to a category of vehicles that are capable of sensing and driving in a surrounding by itself. The vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The vehicle 100 can also include myriad actuators to propel and navigate the vehicle 100 in the surrounding. Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LiDARs) 102, ultrasonic sensors 103, radar systems 104, camera systems 106, GPS, sonar, IMU (inertial measurement unit), accelerometers, gyroscopes, magnetometers, FIR (far infrared) sensors, and/or the like. The one or more sensors allow the vehicle 100 to sense an environment around the vehicle 100. For example, the LiDARs 102 can generate a three-dimensional map of the environment. The LiDARs 102 can also detect objects in the environment. In another example, the radar systems 104 can determine distances and speeds of objects around the vehicle 100. In another example, the camera systems 106 can capture and process image data to detect and identify objects, such as road signs, as well as deciphering content of the objects, such as speed limit posted on the road signs.

In the example of FIG. 1, the vehicle 100 is shown with a LiDAR 102. The LiDAR 102 may be coupled to a roof or a top of the vehicle 100. As discussed, LiDARs such as LiDAR 102 can be configured to generate three dimensional maps of an environment and detect objects in the environment. In the example of FIG. 1A, the vehicle 100 is shown with four radar systems 104. Two radar systems are coupled to a front-side and a back-side of the vehicle 100, and two radar systems are coupled to a right-side and a left-side of the vehicle 100. In some embodiments, the front-side and the back-side radar systems can be configured for adaptive cruise control and/or accident avoidance. For example, the front-side radar system can be used by the vehicle 100 to maintain a healthy distance from a vehicle ahead of the vehicle 100. In another example, if the vehicle ahead experiences a sudden reduction in speed, the vehicle 100 can detect this sudden change in motion and adjust its vehicle speed accordingly. In some embodiments, the right-side and the left-side radar systems can be configured for blind-spot detection. In the example of FIG. 1A, the vehicle 100 is shown with six camera systems 106. Two camera systems are coupled to the front-side of the vehicle 100, two camera systems are coupled to the back-side of the vehicle 100, and two camera systems are couple to the right-side and the left-side of the vehicle 100. In some embodiments, the front-side and the back-side camera systems can be configured to detect, identify, and decipher objects, such as cars, pedestrian, road signs, in the front and the back of the vehicle 100. For example, the front-side camera systems can be utilized by the vehicle 100 to determine speed limits. In some embodiments, the right-side and the left-side camera systems can be configured to detect objects, such as lane markers. For example, side camera systems can be used by the vehicle 100 to ensure that the vehicle 100 drives within its lane.

Figure 2:
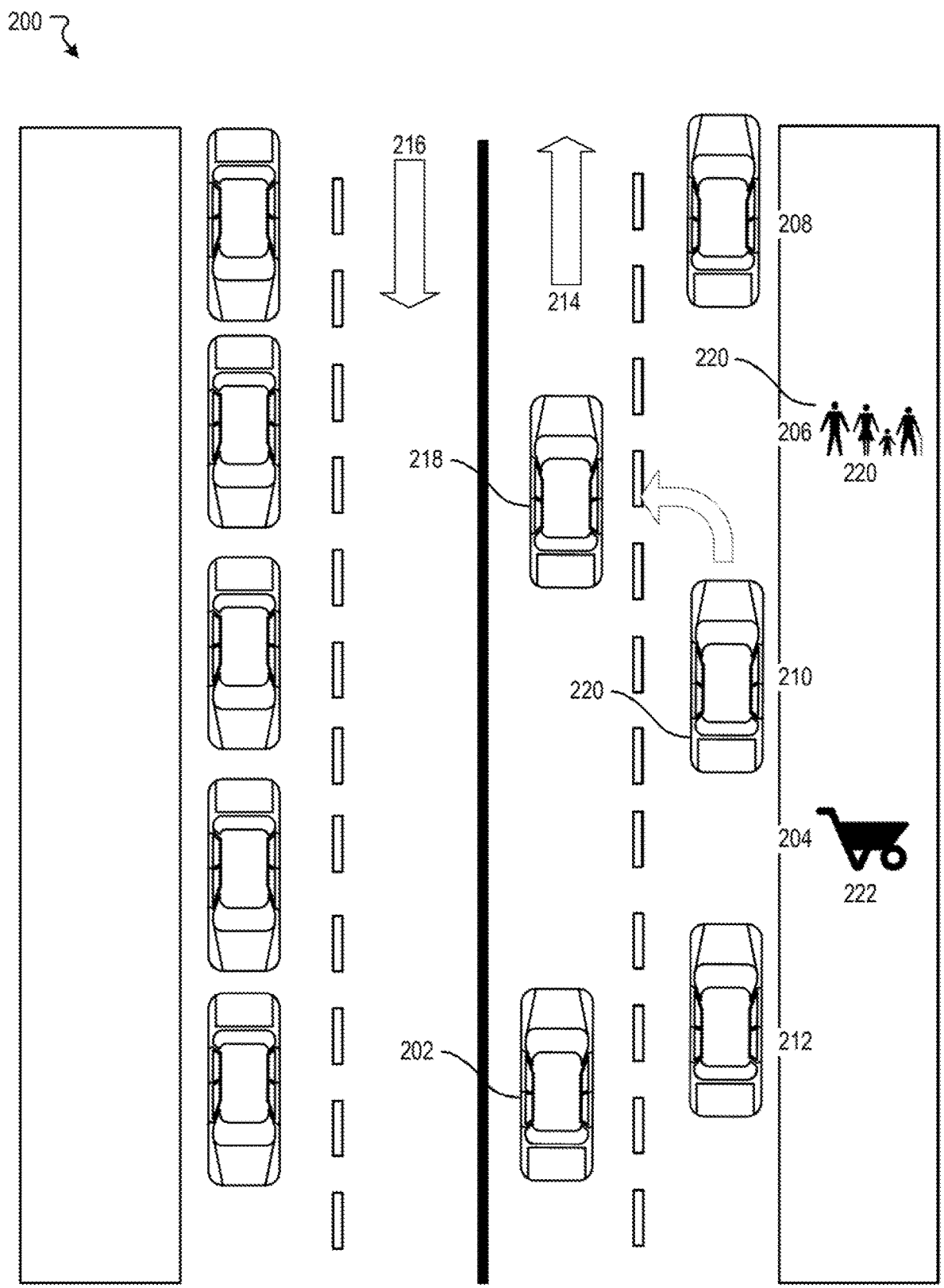
FIG. 2 illustrates an example diagram of a vehicle determining and selecting a stop point, according to an embodiment of the present disclosure.

FIG. 2 illustrates an example environment 200 in which a vehicle 202 determines and selects a stop point (e.g., parking spot, pick up, or drop off point, etc.), in accordance with the present disclosure. In various embodiments, the vehicle 202 may be implemented as the vehicle 100 of FIG. 1. In some embodiments, the vehicle 202 may utilize its onboard sensors, including a LiDAR, radars, cameras, GPS, and/or ultrasonic sensors, for example, to identify or detect one or more stop points in a surrounding. For example, the vehicle 202 may use the LIDAR to identify or detect a stop point via reflected laser beams emitted from the LIDAR. As another example, the vehicle 202 may use the cameras to capture images of a surrounding and process the images to identify or detect a stop point in the surrounding. In some embodiments, data collected by the sensors of the vehicle 202 can be uploaded and stored to a server over a network (e.g., a wireless network), for example, for utilization by other vehicles. For example, point cloud data corresponding to a LIDAR can be uploaded and stored in a remote server. In some embodiments, the vehicle 202 may utilize data of other vehicles (e.g., a vehicle 218) to identify or detect one or more stop points. For example, point cloud data collected by the vehicle 218's LIDAR may be uploaded and stored in the server over the network. In this example, the vehicle 202 may access (e.g., download) the vehicle 218's point cloud data stored in the server, over the network, and process the point cloud data to identify or detect one or more stop points. In some embodiments, data stored in the server may comprise mapping data (e.g., location coordinates) and pictorial data (e.g., point cloud data of a LIDAR, images from cameras, etc.) collected by sensors onboard a vehicle (e.g., the vehicle 202), sensors onboard other vehicles (e.g., the vehicle 218), sensors from satellites (e.g., satellite imagery), road sensors on traffic lights, and/or data form third party sources (e.g., third party map sources and/or third party stop point data sources). In some embodiments, if the vehicle 202 is unable to use its onboard sensors or sensors of other vehicles to identify or detect one or more stop points, the vehicle 202 may, in response, use some or all of the data stored in the server. For example, the vehicle 202 may use data from satellites and/or road sensors to determine one or more stop points. As another example, the vehicle may access third party stop point data stored in the server to determine one or more stop points. In some embodiments, data from data sources may be combined in the server. For example, pictorial data collected from vehicles, satellites, and road sensors may be combined in the server by using timestamp information.

As depicted in FIG. 2, the vehicle 202, using its onboard sensors and/or data stored in the server, may identify or detect stop points 204, 206, 208, 210, and 212, on a side 214 of a road, for example, by analyzing gaps between other stopped vehicles, stationary objects, or moving objects. The vehicle 202, based on the onboard sensors, may determine that the stop points 204 and 206 are available, while the stop points 208, 210, and 212 are occupied, and thus unavailable. For example, the vehicle 202 may use the onboard LIDAR or cameras to determine availability of stop points. The vehicle 202 may further determine that no stop points are available on an opposite side 216 of the road using the onboard sensors. Between the available stop points 204 and 206, the vehicle 202 may select one stop point based on one or more criteria. Such criteria, in some embodiments, may include, for example, a legality of a stop point, a safety condition for the vehicle 202, a safety condition for surrounding traffic including pedestrians and other vehicles, and/or a safety condition for an owner of the vehicle 202. In some embodiments, a legality of a stop point may be dependent or based on how long the vehicle 202 is required to, or desires to, stop at the stop point. In some cases, the legality of the stop point may be based on a type of the stop point. For example, the type of the stop point may indicate whether the stop point is intended for short-term parking (e.g., a pick up or drop off point) or long-term parking. For instance, if the vehicle 202 is merely picking up or dropping off passengers or cargo, the vehicle 202 may legally occupy either of a stop point intended for short-term parking or a stop point intended for long-term parking. In this instance, if the vehicle 202 requires, or requests, parking for a duration extending beyond that of a pick up or drop off, the vehicle 202 may not legally occupy a stop point intended for short-term parking. To illustrate, in FIG. 2, if the stop point 206 is a pick up or drop off stop point (e.g., a loading zone), the vehicle 202 may not legally select the stop point 206 if the vehicle 202 intends, or otherwise provide an indication, to park in the loading zone for a duration exceeding a legal time limit corresponding to the loading zone. As another example, the vehicle 202 may not select a stop point associated with a bus stop unless permitted by law.

In some embodiments, the vehicle 202, using its onboard sensors and/or data stored in the server, may select a stop point having a safest condition (a highest safety) for the vehicle 202, surrounding traffic, and/or the owner of the vehicle 202. As an example, the vehicle 202 may detect, using its onboard sensors or sensor data from other vehicles, a potentially unsafe condition for the vehicle 202 and/or the owner of the vehicle 202 adjacent to a stop point. In this example, the vehicle 202, in response, may not select that stop point. In general, a potentially unsafe condition may be a crowd of people (e.g., persons 220) standing next to a stop point (e.g., the stop point 206). In some embodiments, the vehicle 202 may determine a degree of danger based on, for example, how long the persons 220 have been loitering or standing in the area near the stop point 206, actions that the persons 220 have taken or are taking, objects or weapons that the persons 220 are possessing, and/or a number of persons 220 present next to the stop point 206. Many variations are possible.

In some embodiments, the vehicle 202, using its onboard sensors and/or data stored in the server, may detect a potentially unsafe condition for the vehicle 202, surrounding traffic, and/or the owner of the vehicle 202 based on events occurring adjacent to a stop point. For example, the vehicle 202 may detect a construction activity 222 near the stop point 204 which may cause an unsafe condition for the surrounding traffic (e.g., construction workers), the vehicle 202, and/or the owner of the vehicle 202. As another example, the vehicle 202 may detect a nearby police activity as a potentially unsafe condition. Again, many variations are possible.

In some embodiments, the vehicle 202, using its onboard sensors and/or data stored in the server, may detect a potentially unsafe condition based on a smog level, a pollution level as reported by an air quality index (AQI), a noise level, an amount of ambient lighting, and/or a temperature gradient indicating a fire adjacent to a stop point. For example, the vehicle 202 may detect a potentially unsafe condition if the smog level, AQI, noise level, and/or the temperature gradient exceeds a threshold, and/or if an amount of ambient lighting at night is less than a threshold. In some embodiments, the vehicle 202 may detect a potentially harmful object, such as broken glass or garbage, at a stop point as a potentially unsafe condition using the onboard sensors. For example, cameras onboard the vehicle 202 may be used to capture images of a surrounding and, through image processing, the vehicle 202 may identify broken glass or garbage in the surrounding.

In some embodiments, if the vehicle 202 detects a potentially unsafe condition, the vehicle 202 may assess a risk and/or severity of the potentially unsafe condition. In such embodiments, the vehicle 202 may select a stop point having a lowest risk and/or severity of the potentially unsafe condition. For example, between two stop points, the vehicle 202 may access risks (e.g., broken glass, construction activity, etc.) associated with the two stop points and select a stop point between the two stop points based on the stop point having a lower risk to the vehicle 202 and/or the owner of the vehicle 202. In some embodiments, the vehicle 202 may not select any stop point having a predetermined level risk and/or severity of an unsafe condition (e.g., above a threshold).

In some embodiments, the vehicle 202 may, additionally or alternatively, select a stop point based on its proximity to a desired destination. For example, the vehicle 202 may select a stop point that is closest to the desired destination. In some embodiments, the vehicle 202 may, additionally or alternatively, select a stop point having a minimum difficulty of entry. For example, the vehicle 202 may select a stop point that does not require reverse entry (e.g., parking backwards in reverse). Thus, as depicted in FIG. 2, the vehicle 202 may select the stop point 206 over the stop point 204 because the stop point 206 is wider (e.g., larger, bigger, etc.) and thus has better ease of entry.

In some embodiments, the vehicle 202 may, additionally or alternatively, select a stop point based on one or more road conditions. Such road conditions may include, example, slope (e.g., incline or decline) or bumpiness of roads. For example, the vehicle 202 may limit its selection of stop points to roads having a slope under a threshold, or roads having a bumpiness under a threshold (as measured, for example, by an IMU). As another example, the vehicle 202 may permit selection of a stop point on a road having a threshold slope and enact a further precautionary step such as activating a parking brake or rotating tires of the vehicle toward or away from a curb in response to the slope of the road.

In some embodiments, vehicles may communicate with one another. For example, the vehicle 202 may communicate with the vehicle 218 when the two vehicles are within a threshold distance. The communication between the vehicles may be implemented in various ways. For example, the vehicle 202 may communicate with the vehicle 218 via an ad-hoc network using Wi-Fi (e.g., IEEE 802.11), Bluetooth (e.g., IEEE 802.15), or other suitable wired or wireless technologies. In some embodiments, vehicles may communicate with one another over a cellular network when the vehicles are not within the threshold distance. For example, the vehicle 202 may communicate with vehicle 218 over an LTE, GPRS, GSM, and/or CDMA cellular network. In some embodiments, vehicles may communicate to coordinate activity with one another. The vehicles may coordinate with one another to share a stop point, for example. For example, in FIG. 2, a vehicle 220 currently occupies the stop point 210 and is about to leave the stop point 210. The vehicle 220 may communicate, via the ad-hoc network, to the vehicle 202 that the stop point 210 will soon be available. In this example, the vehicle 202 may elect to wait for the vehicle 220 to move out of the stop point 210 rather than to look for a different stop point. In some embodiments, vehicles may coordinate sharing of a stop point, over a network (e.g., a cellular network), through the server. For example, the vehicle 220 may communicate to the server that it will depart the stop point 210 at a certain time. Contemporaneously, in this example, the vehicle 202 has been looking for a stop point for some time and the vehicle 202 may communicate to the server to request for an open stop point. In this example, the server, with information that the vehicle 220 is about to leave the stop point 210, may provide location coordinates (e.g., longitude and latitude coordinates) of the stop point 210 to the vehicle 202 so the vehicle 202 can occupy the stop point 210 as soon as the vehicle 220 departs or leaves.

In some embodiments, the vehicle 202 may communicate with multiple other vehicles in a specific neighborhood, area, or region, including the vehicle 220 (e.g., via the ad-hoc network) that the vehicle 202 may plan to use a stop point in a specific neighborhood, area, or region. The vehicle 202 may additionally provide an estimated arrival time based on road, weather, and traffic conditions. The multiple vehicles may scan for possible stop points and communicate to the vehicle 220 once a stop point is found in the specific neighborhood, area, or region. In some examples, the multiple other vehicles may determine whether one of the multiple other vehicles is blocking a potential stop point, for example, due to improper parking. For example, if one of the multiple other vehicles, by moving forward, backward, or laterally, may create an additional open space for a stop point, that vehicle is informed and requested to move to create the additional open space. Once the vehicle 220 successfully arrives at the stop point, the vehicle 220 may send an acknowledgement to the server so the multiple other vehicles may stop searching for the stop point. In some embodiments, the server may be part of a dispatch center to coordinate arrival and departure times of vehicles.

In some embodiments, the server can coordinate arrival and departure times of vehicles to optimize utilization of one or more stop points. For example, in some embodiments, the server can instruct a vehicle to occupy a stop point for a longer duration in order to better coordinate arrival of another vehicle. For example, in FIG. 2, the vehicle 220 has communicated to the server that it is about to depart the stop point 210. Contemporaneously, in this example, the vehicle 202 has communicated to the server that in a time period (e.g., 10 minutes), it will need a stop point in an area near where the vehicle 220 is currently parked. In this example, the server may instruct the vehicle 220 to stay in the stop point 220 longer to allow the vehicle 202 to occupy the stop point 220 when the vehicle 220 departs. In some embodiments, the server can schedule or reserve a stop point for a vehicle. For example, the vehicle 202 communicates to the server that at a particular time, the vehicle 202 will arrive at a particular location. Prior to the particular time, the server may instruct another vehicle to occupy a stop point near the particular location such that when the vehicle 220 arrives at the particular location at the particular time, the vehicle 220 can occupy the stop point left vacant by the another vehicle.

In some embodiments, the server may maintain a database of available stop points in a central repository. For example, as vehicles are in motion, the vehicles using onboard sensors can identify various unoccupied (e.g., empty) stop points in real-time (or near real-time). The vehicles can communicate (e.g., report) location coordinates of these unoccupied stop points to the server. The server may, in turn, log or update the database in the central repository responsive to the vehicles' communication. In various embodiments, upon a request from a vehicle, the server can provide, based on the database stored in the central repository, an unoccupied stop point closest to a location headed by the vehicle.

Figure 3:
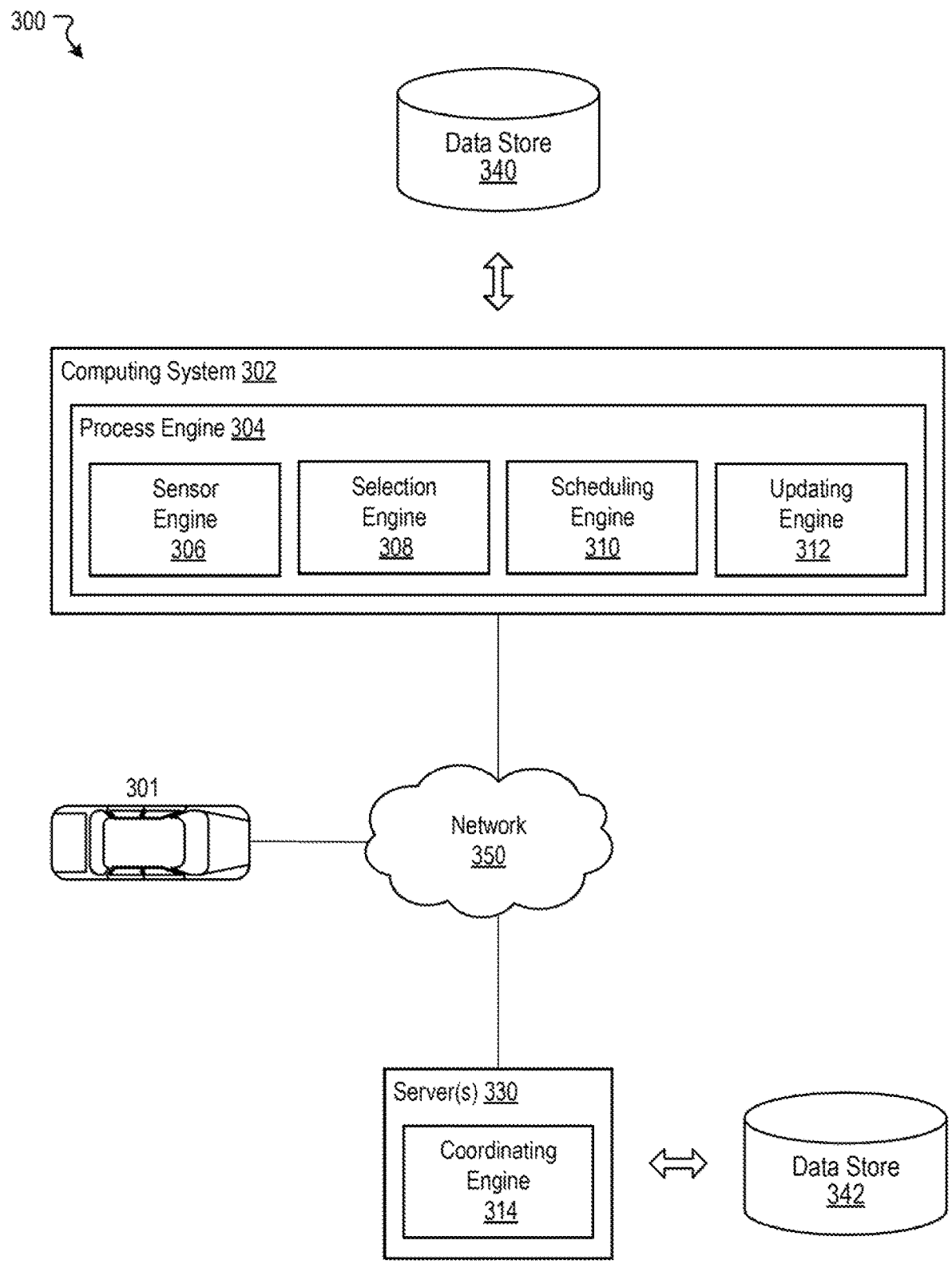
FIG. 3 illustrates an example computing environment of a vehicle system that determines and selects a stop point, according to an embodiment of the present disclosure.

FIG. 3 illustrates an example computing environment 300 of a vehicle system configured to determine and select a stop point, in accordance with the present disclosure. The example computing environment 300 may include a vehicle 301, a computing system 302, and one or more servers 330. In various embodiments, the vehicle 301 may be implemented as the vehicle 202 or the vehicle 100, and connected, over a network 350, to the computing system 302 and/or the one or more servers 330. The computing system 302 may include one or more processors and memory. The processors may be configured to perform various operations by interpreting machine-readable instructions. In some embodiments, the computing system 302 may be implemented locally in the vehicle 301. In some embodiments, the computing system 302 may be implemented remotely as part of the one or more servers 330. In some embodiments, the computing system 302 may be implemented as a data platform. In some embodiments, the example computing environment 300 may be configured to interact with computing systems of the data platform. In various embodiments, one or more computing systems of the data platform may receive and process requests to obtain sensor data, process the sensor data, determine stop points and available stop points, select a stop point, reserve a stop point, and/or update a status of stop points.

In some embodiments, the computing system 302 may include a process engine 304. The process engine 304 may include a sensor engine 306, a selection engine 308, a scheduling engine 310, and an updating engine 312. The process engine 304 may be executed by the processor(s) of the computing system 302 to perform various operations including those operations described in reference to the sensor engine 306, the selection engine 308, the scheduling engine 310, and the updating engine 312. In general, the process engine 304 may be implemented, in whole or in part, as software that is capable of running on one or more computing devices or systems. In one example, the process engine 304 may be implemented as or within a software application running on one or more computing devices of the vehicle 301 and/or the one or more servers 330 (e.g., network servers, cloud servers, etc.). In some embodiments, various aspects of the sensor engine 306, the selection engine 308, the scheduling engine 310, and the updating engine 312 may be implemented in one or more computing systems and/or devices. In some embodiments, one or more of the sensor engine 306, the selection engine 308, the scheduling engine 310, and the updating engine 312 may be combined or integrated into a single processor, and some or all functions performed by one or more of the sensor engine 306, the selection engine 308, the scheduling engine 310, and the updating engine 312 may not be spatially separated, but instead may be performed by a common processor.

In some embodiments, the computing system 302 may be communicatively coupled to the one or more servers 330 over the network 350. The network 350, in various embodiments, may be implemented using any commonly known networking methods. For example, the network 350 can be implemented using wired or wireless networks. In one example, the network 350 can be implemented as a local area network (e.g., ethernet). In another example, the network 350 can be implemented as a wireless network (e.g., WiFi, Bluetooth, cellular, etc.) or any other suitable wireless technologies. In some embodiments, the one or more servers 330 may include a coordinating engine 314. In some embodiments, the computing environment 300 may further include data stores 340 and 342. The data store 340 may be accessible to the computing system 302. The data store 342 may be accessible to the or more servers 330. In various embodiments, the data stores 340 and/or 342 may store mapping and pictorial data collected by one or more sensors of the vehicle 301, one or more sensors of other vehicles, one or more satellites, and/or one or more road sensors such as sensors on traffic lights. In some embodiments, the data stores 340 and/or 342 may store a database of available stop points in a central repository. In some embodiments, the one or more servers 330 may integrate data from different sources. For example, the one or more servers 330 may integrate mapping and pictorial data from the vehicle 301, from other vehicles, from satellites, and store the mapping and pictorial data in the data store 342. In some embodiments, the data stores 340 and/or 342 may integrate data associated with stop points. For example, the data stores 340 and/or 342 may integrate data associated with stop point gathered by a plurality of vehicles into a database stored in a central repository. In other embodiments, the one or more servers 330 may keep data from the different sources separate. In some embodiments, the one or more servers 330 may store data that may be accessed by the process engine 304 to provide the various features described herein. For example, the process engine 304 may access data stored in the data store 342 over the network 350. In some embodiments, the one or more servers 330 may include federated data stores, databases, or any other type of data source from which data may be stored and retrieved, for example. In some embodiments, the one or more servers 330 may include various types of data sets on which determinations of accuracy or consistency with other information can be made. In general, the vehicle 301, and the computing system 302, and the one or more servers 330 may communicate with one another over the network 350, for example, through one or more application programming interfaces (APIs).

The sensor engine 306 may be configured to obtain and process sensor data collected from one or more sensors of a vehicle (e.g., the vehicle 301). The sensor engine 306 may continuously obtain the sensor data or obtain the sensor data at discrete time intervals. The sensor data may comprise pictorial or image data captured in either in real-time (near real-time) or with a time delay by the one or more sensors onboard the vehicle. The sensor data may further comprise timestamp data indicating a time of capture of the sensor data. In some embodiments, the sensor engine 306, or a separate processing engine (not shown) may further process the obtained sensor data to identify or detect a stop point. For example, a vehicle may use its LIDAR to identify or detect available stop points (e.g., empty parking spaces). As another example, the vehicle may use its cameras to identify or detect the available stop points. In some embodiments, the sensor engine 306 may determine location coordinates of a stop point. For example, once the sensor engine 306 identifies an available stop point, the sensor engine may obtain location coordinates from a GPS system of the vehicle and associate this location coordinate with the available stop point. Thus, the sensor engine 306 may determine, from the obtained sensor data, one or more available stop points.

The selection engine 308 may be configured to select a stop point from the one or more available stop points based on the sensor data obtained and processed by the sensor engine 306. As described with respect to the vehicle 202 in FIG. 2, the selection engine 308 may select a stop point based on certain criteria. Such criteria may include a legality of a stop point, a safety for the vehicle 301, a safety for surrounding traffic, and a safety for an owner of the vehicle 301, for example. In some embodiments, the selection engine 308 may, additionally or alternatively, select a stop point based on ease of entry. For example, if a stop point requires a vehicle to reverse to enter, the selection engine 308 may eliminate such stop point from selection. In some embodiments, the selection engine 308 may, additionally or alternatively, select a stop point based on a convenience to the owner. For example, the selection engine 308 may select a stop point based on a distance of the stop point closest to the owner's desired destination. In some embodiments, the selection engine 308 may, additionally or alternatively, select a stop point based on a slope of a road. For example, if a stop point is on a slope and tires of the vehicle 301 need to be turned toward or away from a curb, the selection engine 308 may exclude the stop point from selection.

The scheduling engine 310 may be configured to aggregate stop points based on the sensor data obtained and processed by the sensor engine 306. For example, as the vehicle 301 is in motion, sensors onboard the vehicle 301 are constantly scanning a surrounding. As part of this scanning, the vehicle 301 can determine availability of stop points based on data collected by the sensors. Based on the processed sensor data, the scheduling engine 310 may determine whether a stop point is available, reserve an available stop point for current and future use through the one or more servers 330, while notifying other vehicles and the one or more servers 330 that the stop point is unavailable while the stop point is being reserved. In some embodiments, the scheduling engine 310 may be configured to aggregate stop points based on data associated with stop points. The data associated with the stop points can be requested and obtained from the one or more servers 330. For example, the scheduling engine 310 can request and obtain, through the updating engine 312, point cloud data of other vehicles, process the point cloud data, and determine availability of stop points based on the processed data. In some embodiments, the scheduling engine 310 aggregate and log information relating to availability of stop points. Such information can include, for example, an identifier associated with a stop point, a type of the stop point, location coordinates of the stop point. In some embodiments, the scheduling engine 310 may update the information relating to availability of stop points based on an update received from the one or more servers 330. Further details of the scheduling engine 310 will be provided in FIG. 4.

The updating engine 312 may be configured to update a status of stop points to keep track of whether a stop point is currently in use or reserved for use. For example, the updating engine 312 may be configured to pictorially update a display or chart indicating a the status of stop points. In some embodiments, the updating engine 312 may communicate (e.g., upload) the status to the one or more servers 330 such that availability of stop points can be coordinated. The one or more servers 330 can update a database stored in a central repository to reflect latest status of stop points as determined by the scheduling engine 310. In some embodiment, upon a request from the scheduling engine 310, the updating engine 312 may receive a status of available stop points at a particular location from the one or more servers 330.

The coordinating engine 314 can be configured to coordinate activities of vehicles to optimize utilization of stop points. The coordinating engine 314, in various embodiments, may receive a status of stop points from a vehicle (e.g., the vehicle 301) through the updating engine 312 of the vehicle that the one or more server 330 has established a communication. For example, because the vehicle 301 is communicating with the one or more servers 330, the coordinating engine 314 may receive a status of stop points from the vehicle 301. In general, the coordinating engine 314 may receive a plurality of status of stop point from a plurality of vehicles. In some embodiments, the coordinating engine 314 may determine whether a stop point is available for use by other vehicles. For example, the coordinating engine 314 can determine, based on statuses of stop points reported by vehicles, locations (e.g., location coordinates) of available of stop points. In some embodiments, the coordinating engine 314 may reserve, for a vehicle, an available stop point for current and future use. For example, the vehicle 301 may reserve a stop point through the one or more server 330 using the coordinating engine 314. In this example, in response to a reservation request from the vehicle 301, the coordinating engine 314 can communicate location coordinates of a stop point to the vehicle 301. In some embodiments, the coordinate engine 314 can notify other vehicles that a stop point is unavailable while the stop point is in use. In some embodiments, the coordinate engine 314 may perform conflict checks associated with stop points. For example, in response to determining that a stop point has been reserved by a vehicle, the coordinate engine 314 may determine a reservation time for which that stop point has been reserved coincides with a duration requested by another vehicle. In this example, the coordinating engine 314 may not grant or approve the another vehicle's request to reserve that stop point. As another example, in response to determining that the stop point has not been reserved by the vehicle or that the requested duration does not coincide with the reservation of the vehicle, the coordinating engine 314 may determine that the stop point is available and reserve that stop point for the another vehicle.

Figure 4:
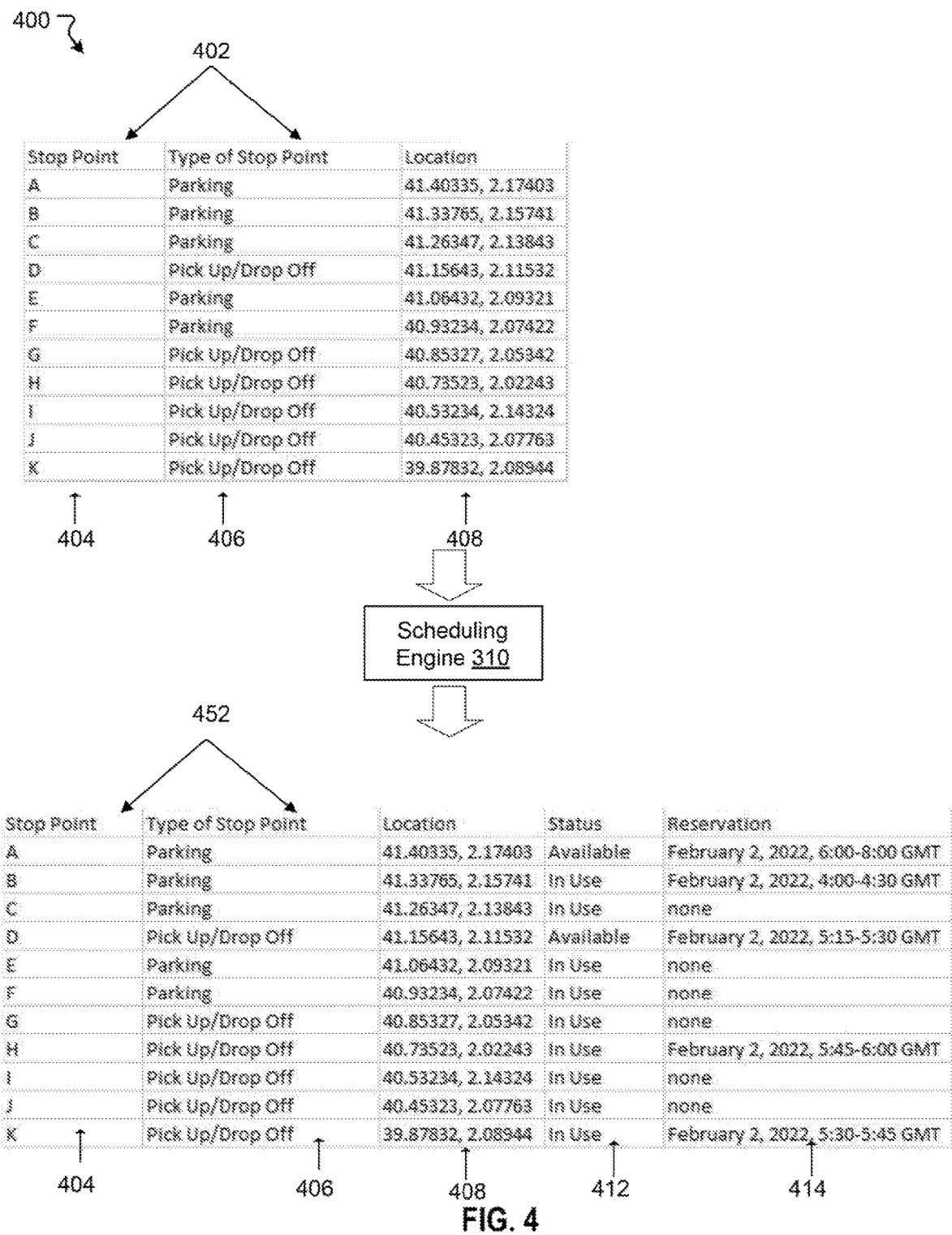
FIG. 4 illustrates an example operation of a scheduling engine, according to an embodiment of the present disclosure.

FIG. 4 illustrates an example operation 400 of the scheduling engine 310. The scheduling engine 310 may accept information 402 regarding stop points 404 at or near a specific destination, types 406 for each respective stop points (e.g., whether each stop point is a long-term parking spot or only a pick-up or drop-off point), and respective location coordinates 408 for each stop points form the sensor engine 306. The scheduling engine 310 may process the information 402 and track, update, and output status and scheduling information 452, based on an update received from the coordinating engine 314 of the one or more servers 330, through the updating engine 312. The status and scheduling information 452 may comprise the information 402 regarding stop points at or near the specific destination, the types 404 for the each respective stop points (e.g., whether each stop point is a long-term parking spot or only a pick-up or drop-off point), the respective location coordinates 408 for each stop points 404, status information 412 corresponding to each stop points 404, and reservation information 414 corresponding to each stop points 404. In some embodiments, the status information 412 indicates a current status of each of the stop points 404, for example, whether or not a stop point is currently occupied by another vehicle or person. In some embodiments, the reservation information 414 shows all future reservations of the stop point by other vehicles. The information presented in FIG. 4 is merely a non-limiting example shown for illustrative purposes.

To successfully reserve a stop point, the vehicle 301 first identifies an available stop point on a road. The vehicle 301 aggregates and updates the information 402 to reflect the availability of the stop point through the scheduling engine 310. The vehicle 301 may request the coordinating engine 314 for an update to determine whether the stop point has been reserved by another vehicle. The scheduling engine 310 updates the information 402 with information provided by the coordinating engine 314 and outputs the status and scheduling information 452 as result. Based on the status and scheduling information 452, the vehicle 301 may either reserve or utilize (e.g., park) the stop point, update the status and scheduling information 452, and communicate the reservation or the utilization back to the coordinating engine 314. For example, the vehicle 301 may request the stop point for use from a current time (e.g., 3:00 GMT) until a later time (e.g., 5:00 GMT) through the coordinating engine 314. The scheduling engine 310, based on the status and scheduling information 452, may find any stop points of type "parking" that are currently available and not reserved from 3:00 GMT until 5:00 GMT, and determine that a stop point (e.g., stop point A in FIG. 4) fits the aforementioned criteria. The scheduling engine 310 may then reserve the stop point A for use from 3:00 GMT until 5:00 GMT and communicates this reservation to the coordinating engine 314.

If a stop point is reserved for use, for example, from 3:00 GMT until 5:00 GMT, but no vehicle appears at the stop point at 3:00 GMT, the scheduling engine 310 of the vehicle 301 may request the coordinating engine 314 to cancel the reservation if no vehicle appears after a certain amount of time (e.g., 5 minutes or 15 minutes) past 3:00 GMT. That stop point would then be available for use for the vehicle 301 or any other vehicles. In some cases, if the vehicle does not report to the coordinating engine 314 that the vehicle is in the stop point within a certain time (e.g., 5 minutes or 15 minutes) after the reserved time, the coordinating engine 314 may automatically cancel the reservation.

Figure 5A:
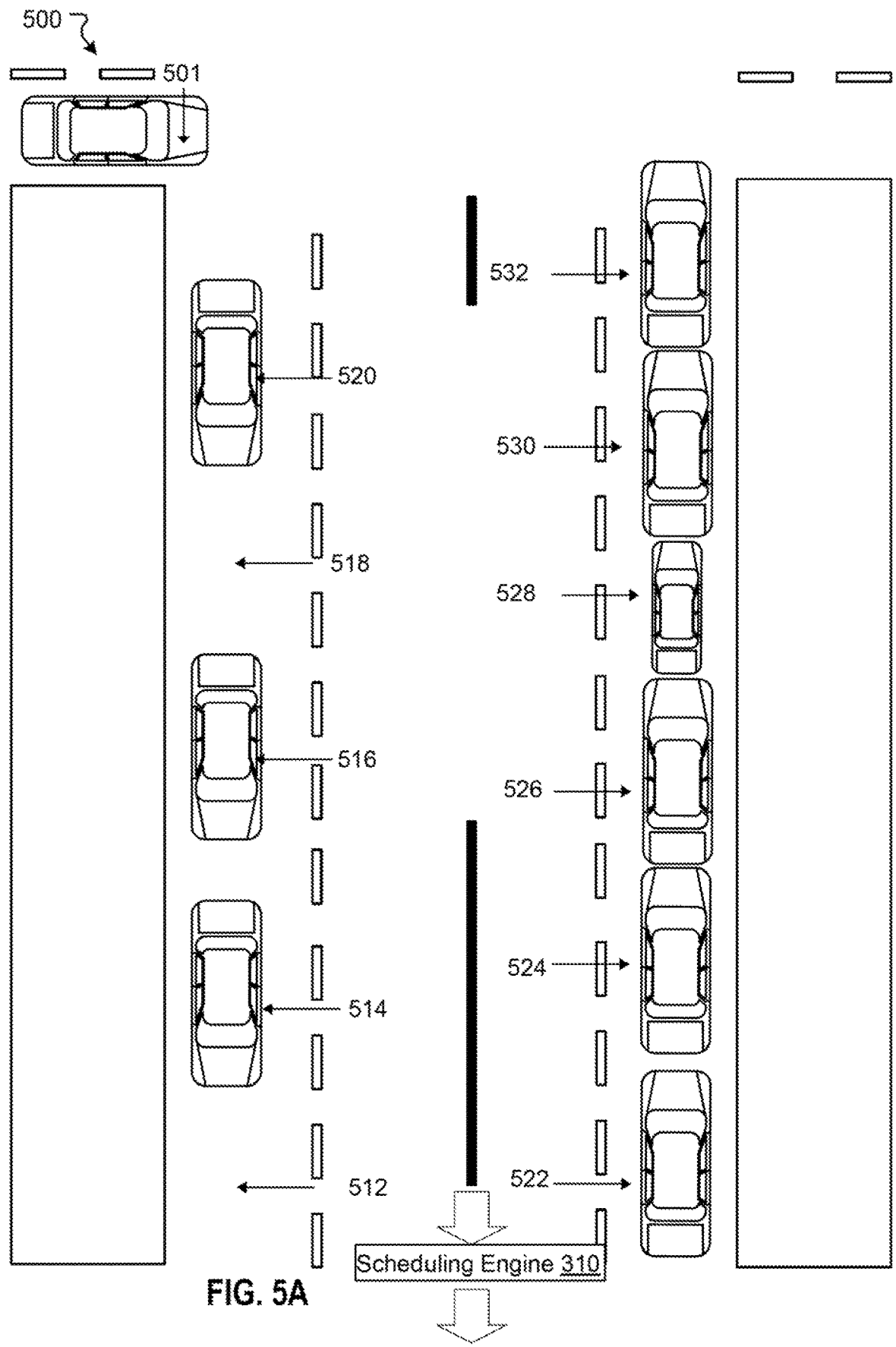
FIG. 5A illustrates an example operation of a scheduling engine, according to an embodiment of the present disclosure.
Figure 5A:
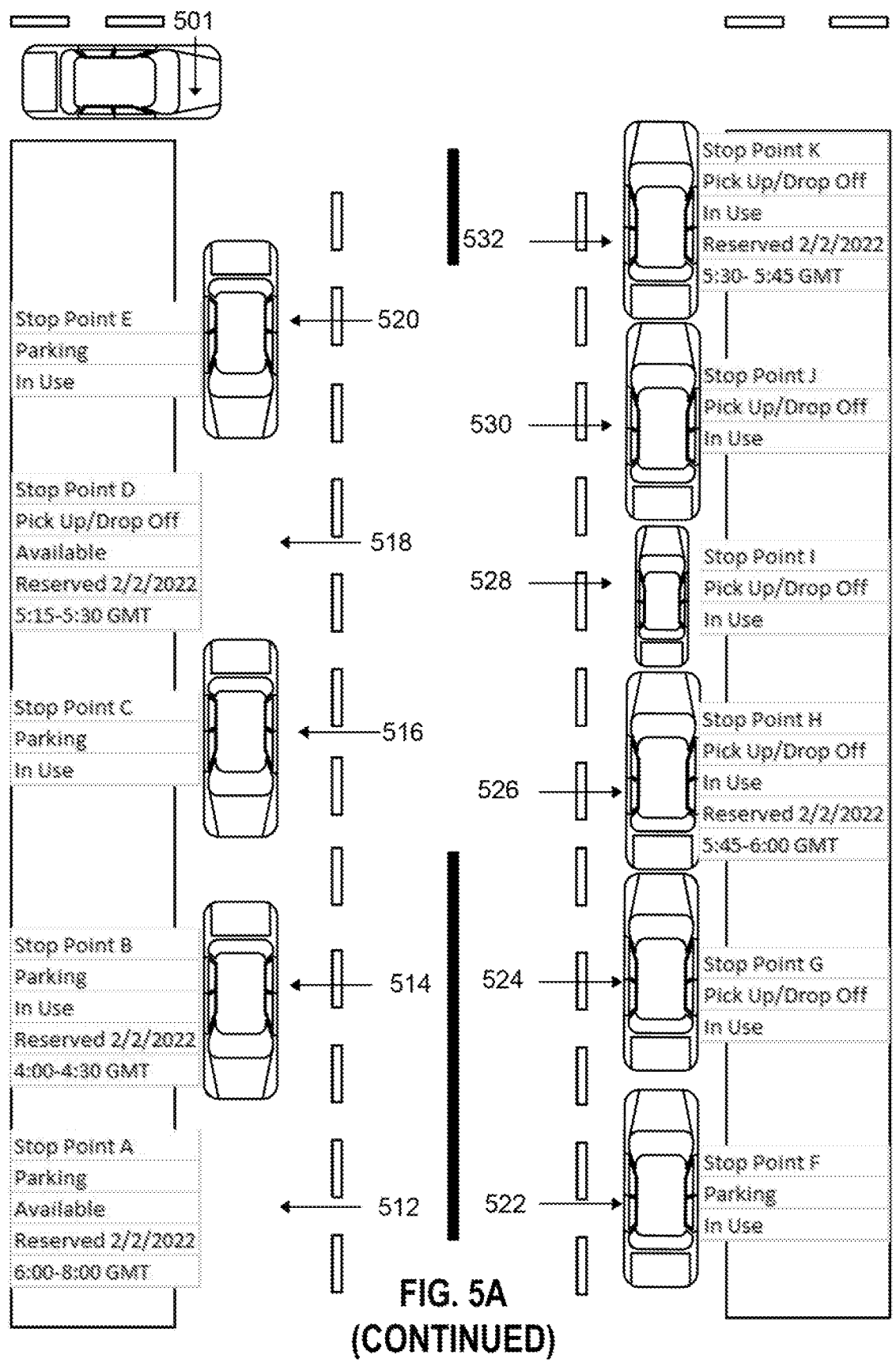

FIG. 5A illustrates an example operation 500 of the scheduling engine 310. The scheduling engine 310 may accept sensor data obtained by the sensor engine 306 associated with a vehicle 501, which may be implemented as the vehicle 301, 202, or 100. The scheduling engine 310 may, alternatively or additionally, accept sensor data associated with one or more other vehicles, mapping or pictorial data from one or more satellites, and/or one or more road sensors such as a traffic light from a server (e.g., the one or more servers 330 of FIG. 3). Through the sensor engine 306, stop points 512, 514, 516, 518, 520, 522, 524, 526, 528, 530, and 532 may be identified or detected. The scheduling engine 310 may, with an update provided by the coordinating engine 314, process, track, and output status and scheduling information for each of the stop points 512, 514, 516, 518, 520, 522, 524, 526, 528, 530, and 532 and display and/or notify a user of the status and scheduling information. For each of the stop points 512, 514, 516, 518, 520, 522, 524, 526, 528, 530, and 532, the scheduling engine 310 may output types of the respective stop points (e.g., whether each stop point is a long-term parking spot or only a pick-up or drop-off point), status information of each of the stop points indicating whether a stop point is currently in use or available, and reservation information of each of the stop points indicating whether and when a stop point is reserved. A user may visualize on a map the status information and the reservation information of each stop point at or near a destination to assist in selecting a stop point. To successfully reserve a stop point, the vehicle 501 sends a request to the coordinating engine 314 regarding a desired time to reserve a stop point. For example, the vehicle 501 may request a stop point for use from a current time (e.g., 3:00 GMT) until 5:00 GMT. The scheduling engine 310, based on the update provided by the coordination engine 314, may determine any stop points of type "parking" that are currently available and not reserved from 3:00 GMT until 5:00 GMT, and determine that a stop point A fits the aforementioned criteria. The scheduling engine 310 may then reserve the stop point A for use from 3:00 GMT until 5:00 GMT through the coordinating engine 314. If a stop point is reserved for use, for example, from 3:00 GMT until 5:00 GMT, but no vehicle appears at the stop point at 3:00 GMT, the scheduling engine 310 may request the coordinating engine 314 to cancel the reservation if no vehicle appears after a certain amount of time (for example, 5 minutes or 15 minutes) after 3:00 GMT. That stop point would then be available for use for other vehicles. The information presented in FIG. 5 is merely a non-limiting example shown for illustrative purposes.

Figure 5B:
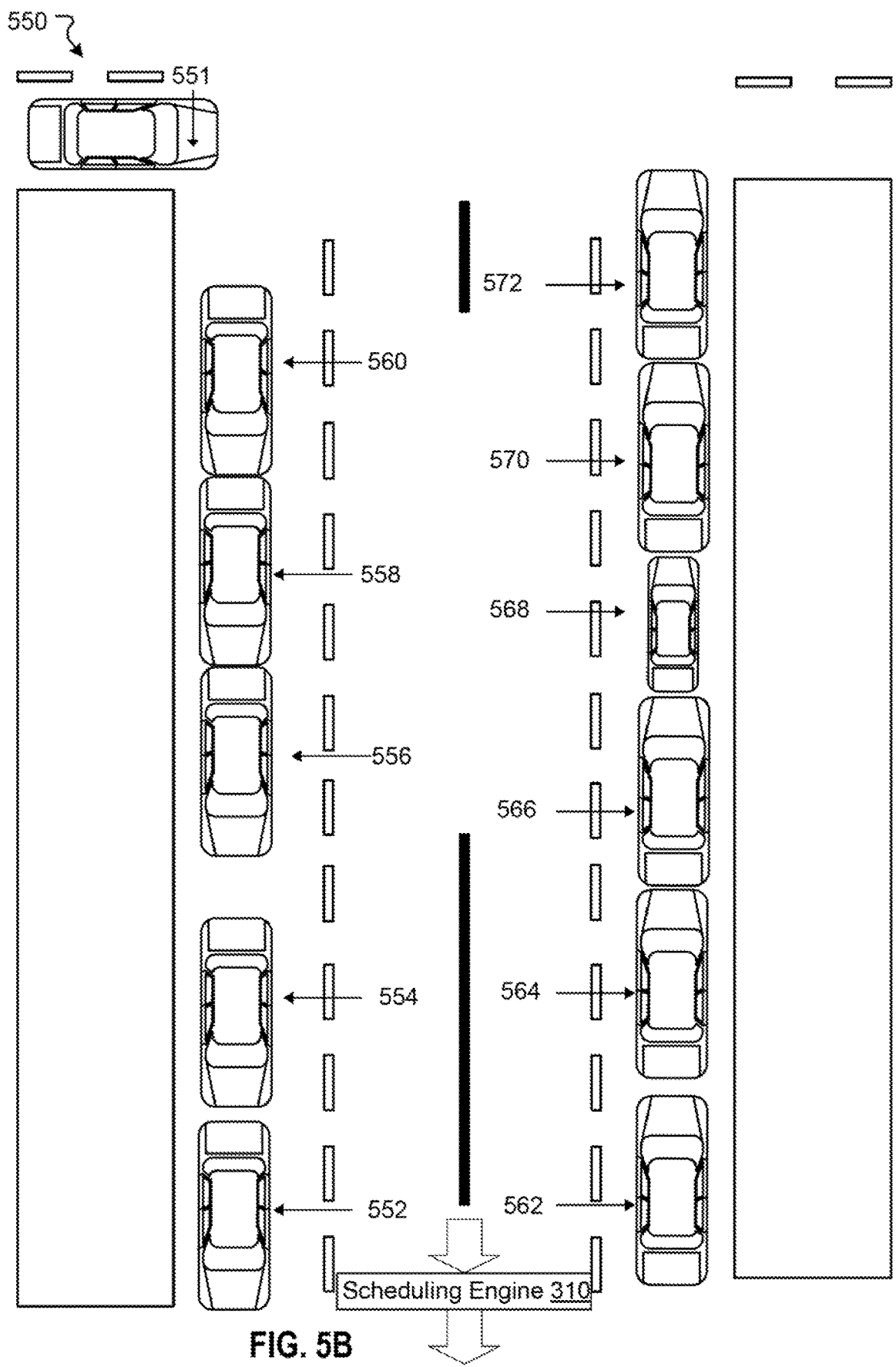
FIG. 5B illustrates an example operation of a scheduling engine, according to an embodiment of the present disclosure.
Figure 5B:
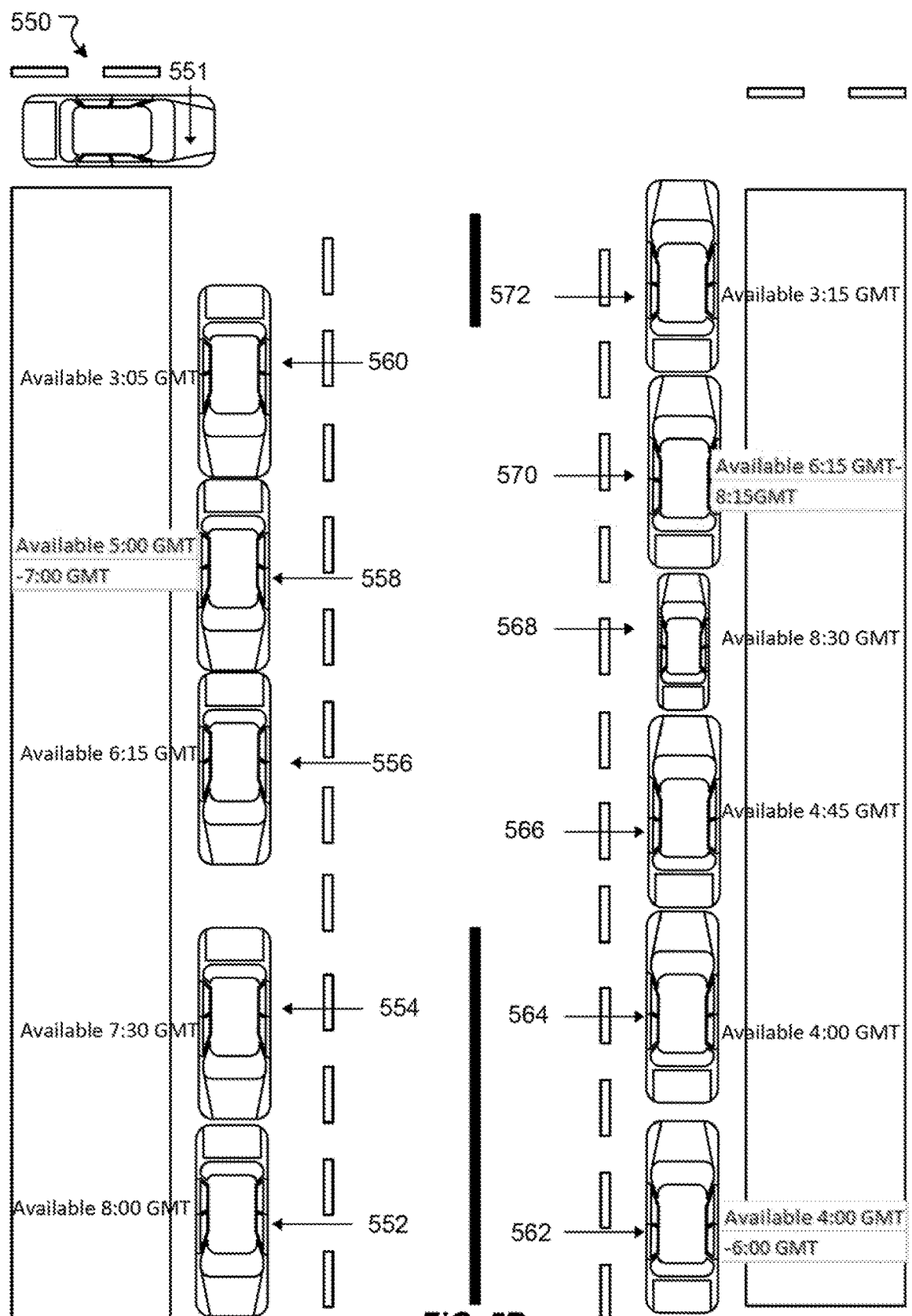

FIG. 5B illustrates an example operation 550 of the scheduling engine 310 of a vehicle 551. The scheduling engine 310 may accept sensor data obtained by the sensor engine 306 of the vehicle 551, which may be implemented as the vehicle 301, 202, or 100. The scheduling engine 310 may, additionally or alternatively, accept sensor data from one or more other vehicles, mapping or pictorial data from one or more satellites, and/or one or more road sensors such as a traffic light from a server (e.g., the one or more servers 330 of FIG. 3). Through the sensor engine 306, stop points 552, 554, 556, 558, 560, 562, 564, 566, 568, 570, and 572 may be identified or detected. The scheduling engine 310 may, with an update provided by the coordinating engine 314, process, track, and output status and scheduling information for each of the stop points 552, 554, 556, 558, 560, 562, 564, 566, 568, 570, and 572 and display and/or notify a user of the status and scheduling information. As an example, if all of the stop points 552, 554, 556, 558, 560, 562, 564, 566, 568, 570, and 572 are currently occupied, the scheduling engine 310 may output and/or provide information regarding when each of the stop points, and a duration of time in which, each of the stop points becomes available. A user of the vehicle 551, for example, may have knowledge of when and where a stop point will become available. Thus, if the vehicle 551 is searching for a stop point, the vehicle 551 will be notified that the stop point 560 will become available at 3:05 GMT (five minutes from a current time) and be able to occupy the stop point 560 at that time. Additionally, if a current vehicle is occupying a stop point and has reserved the stop point for a certain duration, if no other vehicles reserve the stop point, the current vehicle may be allowed to remain past the duration. For example, if no other vehicle reserves the stop point 556 at 6:15 GMT, or otherwise requests a stop point by 6:15 GMT, a vehicle currently occupying the stop point 556 may remain after 6:15 GMT, until another vehicle reserves or requests the stop point 556.

Figure 6:
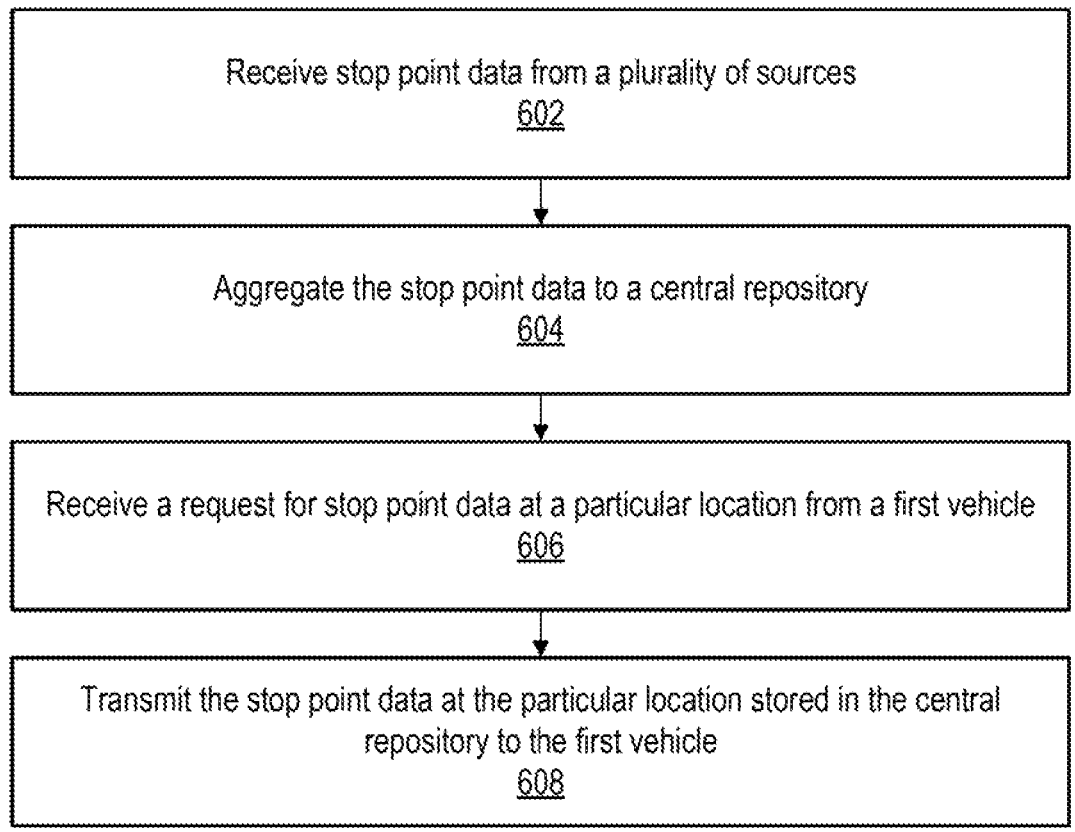
FIG. 6 illustrates an flowchart of an example of a method to determine and select a stop point, according to some embodiments.

FIG. 6 illustrates a flowchart of a method to determine and select a stop point according to some embodiments. In this and other flowcharts, the flowchart 600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 6.

In step 602, stop point data can be received from a plurality of sources. In step 604, the stop point data can be aggregated to a central repository. In step 606, a request for stop point data at a particular location can be received from a first vehicle. In step 608, the stop point data at the particular location stored in the central repository can be transmitted to the first vehicle.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
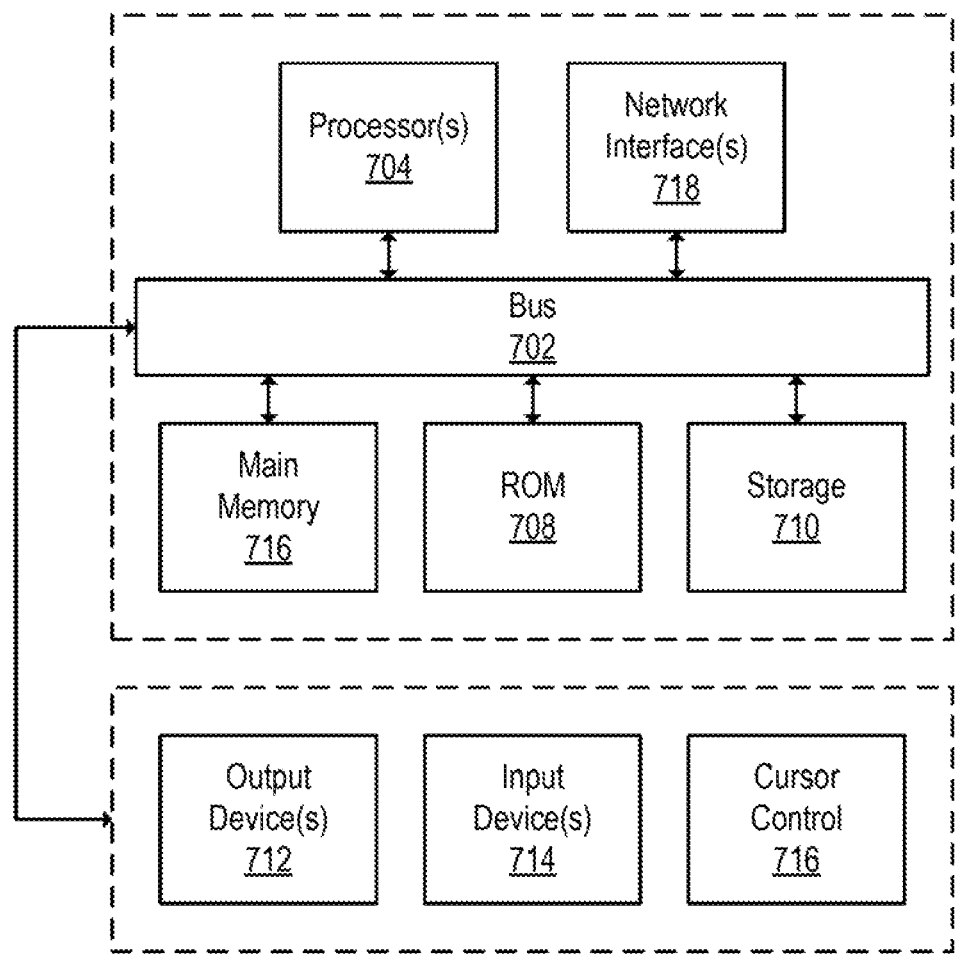
FIG. 7 is a diagram of an example computer system for implementing the features disclosed herein.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method, comprising:
   receiving, by a computing system, stop point data from a plurality of sources, wherein the stop point data comprises point cloud data from a LiDAR and camera data from a camera;
   aggregating, by the computing system, the stop point data to a central repository;
   receiving, by the computing system, a request for stop point data at a particular location from a first vehicle; and
   transmitting, by the computing system, a subset of the stop point data at the particular location stored in the central repository to the first vehicle based on a safety condition for the first vehicle, for the surrounding traffic, and for an owner of the first vehicle, wherein the safety condition for the first vehicle is based on a duration of loitering by a crowd of people adjacent the first vehicle.

2. The computer-implemented method of claim 1, wherein the stop point data includes mapping and pictorial data associated with stop points, and the plurality of sources includes at least one of vehicles, satellites, or road sensors.

3. The computer-implemented method of claim 1, further comprising:
   receiving, by the computing system, from the first vehicle, a request to reserve a stop point at the particular location; and
   updating, by the computing system, the central repository with the request to reserve the stop point at the particular location.

4. The computer-implemented method of claim 3, wherein the request to reserve the stop point at the particular location is determined by the first vehicle based on analyzing the stop point data at the particular location that a stop point is available at the particular location.

5. The computer-implemented method of claim 1, further comprising:
   receiving, by the computing system, from the first vehicle, a request to coordinate stop points at the particular location;
   receiving, by the computing system, from a second vehicle, an indication that the second vehicle will soon depart a stop point at the particular location; and
   transmitting, by the computing system, to the first vehicle, location coordinates of the stop point currently occupied by the second vehicle.

6. The computer-implemented method of claim 5, wherein the request to coordinate a stop point at the particular location is determined by the first vehicle based on analyzing the stop point data at the particular location that a stop point is not available at the particular location.

7. The computer-implemented method of claim 5, further comprising:
   transmitting, by the computing system, an instruction to the second vehicle to delay departing the stop point at the particular location to allow the first vehicle to arrive at the stop point at the particular location within a time period.

8. The computer-implemented method of claim 7:
   receiving, by the computing system, from the second vehicle, an indication that the second vehicle needs to depart immediately from the stop point at the particular location; and transmitting, by the computing system, an instruction to a third vehicle, nearby the particular location, to occupy the stop point at the particular location until the first vehicle arrives.

9. The computer-implemented method of claim 1, further comprising:
receiving, by the computing system, an indication that the reserved stop point is devoid of vehicles for a threshold time period after a beginning of a reserved time; and
cancelling the request to reserve the stop point so that the stop point is available for reservation by other vehicles.

10. The computer-implemented method of claim 1, wherein the safety condition for the first vehicle is based on a type of weapon being carried by the persons.

11. The computer-implemented method of claim 1, wherein the safety condition for the first vehicle is based on a temperature gradient adjacent to the first vehicle.

12. A computing system comprising:
at least one processor; and
a memory storing instructions that, when executed by the at least one processor, cause the computing system to perform:
receiving stop point data from a plurality of sources, wherein the stop point data comprises point cloud data from a LiDAR and camera data from a camera;
aggregating the stop point data to a central repository;
receiving a request for stop point data at a particular location from a first vehicle; and
transmitting a subset of the stop point data at the particular location stored in the central repository to the first vehicle based on a safety condition for the first vehicle, for the surrounding traffic, and for an owner of the first vehicle, wherein the safety condition for the first vehicle is based on a duration of loitering by a crowd of people adjacent the first vehicle.

13. The computing system of claim 12, wherein the instructions cause the computing system to further perform:
receiving from the first vehicle, a request to reserve a stop point at the particular location; and
updating the central repository with the request to reserve the stop point at the particular location.

14. The computing system of claim 12, wherein the instructions cause the computing system to further perform:
receiving from the first vehicle, a request to coordinate stop points at the particular location;
receiving from a second vehicle, an indication that the second vehicle will soon depart a stop point at the particular location; and
transmitting to the first vehicle, location coordinates of the stop point currently occupied by the second vehicle.

15. The computing system of claim 14, wherein the instructions cause the computing system to further perform:
transmitting an instruction to the second vehicle to delay departing the stop point at the particular location to allow the first vehicle to arrive at the stop point at the particular location within a time period.

16. The computing system of claim 15, wherein the instructions cause the computing system to further perform:
receiving from the second vehicle, an indication that the second vehicle needs to depart immediately from the stop point at the particular location; and
transmitting an instruction to a third vehicle, nearby the particular location, to occupy the stop point at the particular location until the first vehicle arrives.

17. A non-transitory computer-readable storage medium including instructions that, when executed by at least one processor of a computing system, cause the computing system to perform a method comprising:
receiving stop point data from a plurality of sources, wherein the stop point data comprises point cloud data from a LiDAR and camera data from a camera;
aggregating the stop point data to a central repository;
receiving a request for stop point data at a particular location from a first vehicle; and
transmitting a subset of the stop point data at the particular location stored in the central repository to the first vehicle based on a safety condition for the first vehicle, for the surrounding traffic, and for an owner of the first vehicle, wherein the safety condition for the first vehicle is based on a duration of loitering by a crowd of people adjacent the first vehicle.

18. The non-transitory computer-readable storage medium of claim 17, wherein the instructions, when executed, cause the computing system to further perform:
receiving from the first vehicle, a request to coordinate stop points at the particular location;
receiving from a second vehicle, an indication that the second vehicle will soon depart a stop point at the particular location; and
transmitting to the first vehicle, location coordinates of the stop point currently occupied by the second vehicle.

19. The non-transitory computer-readable storage medium of claim 18, wherein the instructions, when executed, cause the computing system to further perform:
transmitting an instruction to the second vehicle to delay departing the stop point at the particular location to allow the first vehicle to arrive at the stop point at the particular location within a time period.

20. The non-transitory computer-readable storage medium of claim 19, wherein the instructions, when executed, cause the computing system to further perform:
receiving from the second vehicle, an indication that the second vehicle needs to depart immediately from the stop point at the particular location; and
transmitting an instruction to a third vehicle, nearby the particular location, to occupy the stop point at the particular location until the first vehicle arrives.

* * * * *